March 3, 1959  F. C. HUYSER  2,875,610
GRIPPING MECHANISM FOR TESTING MACHINE
Filed March 9, 1955
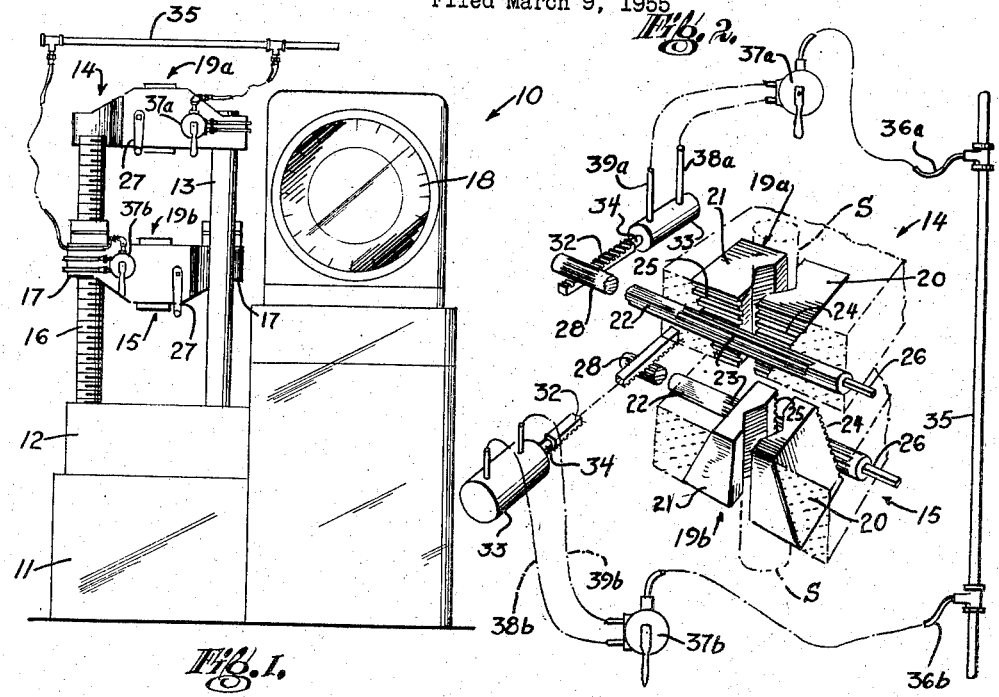
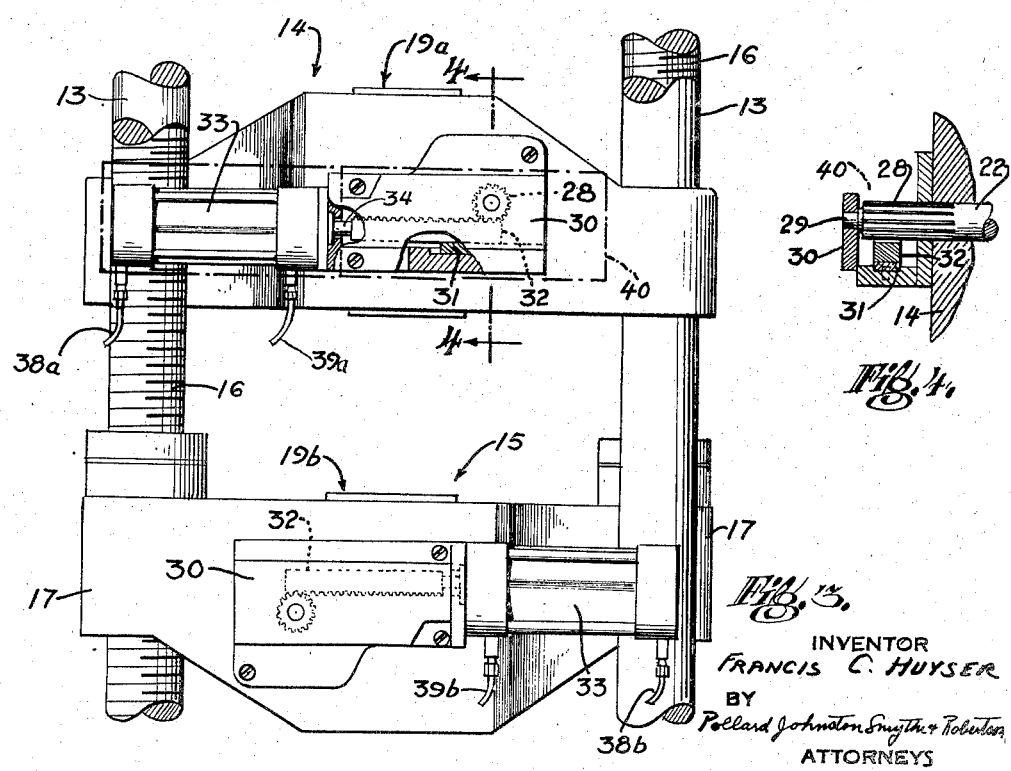
INVENTOR
FRANCIS C. HUYSER
BY
Pollard Johnston Smythe & Robertson
ATTORNEYS United States Patent Office 2,875,610
Patented Mar. 3, 1959

2,875,610

GRIPPING MECHANISM FOR TESTING MACHINE

Francis C. Huyser, Moline, Ill., assignor to American Machine and Metals, Inc., New York, N. Y., a corporation of Delaware Application March 9, 1955, Serial No. 493,092

1 Claim. (Cl. 73—103)

The present invention relates generally to gripping mechanisms for universal testing machines, and more particularly is directed to gripping mechanisms, actuated by a pressure-fluid operated system for holding the opposite ends of a specimen during the tension testing of the latter in a universal testing machine.

A universal testing machine of the kind referred to herein includes a chassis upon which is mounted a weighing table, columns extending upwardly from the latter and an upper or weighing crosshead which is either permanently mounted across the top of the columns or adjustable between fixed stations at desirable intervals along the columns. A lower crosshead is mounted for vertical movement between the weighing table and the upper crosshead, and such movement may be effected by screws extending upwardly from the chassis through nuts on the lower crosshead, with the screws or nuts being rotated. When testing a specimen in tension, the specimen is gripped between the lower or loading crosshead and the upper or weighing crosshead, and the tension load is applied by downward movement of the lower crosshead. The specimen transmits the tension load to the upper crosshead of the weighing cage and the latter, in turn, actuates a suitable load indicating system, while the elongation of the specimen is suitably measured to provide statistics from which the characteristics of the specimen under tension can be determined. In a hydraulic machine, the lower crosshead is adjustable but is stationary when under load, the upper crosshead being moved to apply the load.

In existing testing machines of the described character, the gripping mechanism in each of the upper and lower crossheads for holding the adjacent end of the specimen in the related crosshead during tension testing of the specimen includes a pair of wedge-shaped grips having vertically extending confronting faces to receive an end portion of the specimen therebetween. The outer inclined faces of the grips engage correspondingly inclined guide surfaces within the related crosshead so that vertical movement of the pair of grips relative to the crosshead moves the confronting faces thereof toward and away from each other for respectively gripping and releasing the end portion of the specimen therebetween. Such vertical movement of the pair of grips in each crosshead is effected by a rack and pinion arrangement driven by a removable hand crank.

Although the actuation of the gripping mechanism by manual turning of the crank is suitable for testing machines which are employed only infrequently, this time consuming step which also requires considerable effort in the setting up of a specimen for tension testing is objectionable and wasteful when the testing machine is repeatedly used, for example, for the tension testing of parts from a production line.

Accordingly, it is an object of this invention to provide a pressure fluid operated system for quickly opening and closing the grips in the upper and lower crossheads of a testing machine of the described character.

Another object is to provide a pressure fluid, for example, compressed air, operated system for actuating the gripping mechanism in a testing machine, and which requires little or no modification of the existing gripping mechanism for that purpose.

In accordance with an aspect of this invention, the pinion of the rack and pinion arrangement provided for effecting vertical movement of the grips is formed on a shaft intermediate the ends of the latter, with one end of the shaft having a non-circular configuration, for example, of square cross-section, projecting from the related crosshead to be received in a similarly shaped socket of the removable handcrank, and with the other end of the shaft also projecting from the crosshead and terminating in a pinion meshing with a rack which is reciprocable along the crosshead. The last mentioned rack is actuated by the plunger of a related double-acting compressed air, or other pressure fluid, operated cylinder, and the compressed air, or other pressure fluid, is supplied to one or the other of the ends of the cylinder by a supply system having suitable valves interposed therein for controlling the direction of movement of the plunger, and hence, the opening or closing of the related grips.

It is to be noted that the air operated cylinders also serve as a shock absorber when the test piece breaks.

The above, and other objects, features and advantages of the invention will be apparent in the following detailed description of an illustrative embodiment thereof which is to be read in connection with the accompanying drawing, wherein:

Fig. 1 is a front elevational view of a universal testing machine embodying the present invention;

Fig. 2 is a diagrammatic, perspective view, partly broken away and in section, of the gripping mechanisms and compressed air operated system for actuating the gripping mechanisms in accordance with the invention;

Fig. 3 is an enlarged rear elevational view of a portion of the testing machine of Fig. 1; and Fig. 4 is a fragmentary sectional view taken along the line 4—4 of Fig. 3.

Referring to the drawing in detail and initially to Fig. 1 thereof, a universal testing machine, of a type in connection with which the present invention may be employed, is there illustrated and generally identified by the reference numeral 10. The testing machine 10 includes a chassis 11 having a weighing cage mounted thereon which is made up of a weighing table 12, spaced apart columns 13 extending upwardly from the latter and an upper or weighing crosshead, generally identified by the reference numeral 14, which is either permanently mounted across the top of the columns 13, or locked at desirable stations intermediate the upper ends of the columns and the table 12.

The testing machine 10 is further seen to include a lower crosshead, generally identified by the reference numeral 15, which is vertically movable in the space between the upper crosshead 14 and the table 12. The vertical movement of the lower crosshead in a screw-type testing machine, that is, in a machine of the kind shown in the drawing, is effected by screws 16 extending from the chassis parallel to the columns 13 and threaded through nuts 17 on the crosshead 15, with either the nuts 17 or the screws 16, but preferably the latter, being rotated, for example, by a suitable drive from an electric motor (not shown), to effect the desired movement of the lower crosshead. Although this invention will be described in connection with a screw-type testing machine, it is to be understood that the invention is not so limited and may be employed in connection with testing machines wherein the load is applied hydraulically.

When testing a specimen under tension, the specimen is arranged between the upper and lower crossheads 14 and 15, respectively, with the opposite ends of the specimen being gripped in the crossheads, so that a tension load is applied to the specimen by downward movement of the lower or loading crosshead 15. The tension load applied to the specimen is transmitted by the latter to the upper crosshead 14 of the weighing cage, and a weighing and indicating system (not shown) associated with the weighing cage then indicates the amount of the applied load on a scale 18. At the same time, the elongation of the specimen can be measured by existing devices for that purpose so that, from the relationship of the elongation to the applied load, the characteristics of the specimen under tension can be determined.

In order to hold the opposite end portions of a specimen undergoing a tension test, the upper and lower crossheads are provided with gripping mechanisms, generally identified by the reference numerals 19a and 19b, respectively, which in accordance with the present invention are normally actuated by related quick-acting, pressure fluid operated assemblies.

As seen in Fig. 2, each of the gripping mechanisms 19a and 19b includes a pair of wedge-shaped grips 20 and 21 having their confronting faces extending vertically to receive a test piece or specimen S therebetween, shown in broken lines on Fig. 2, while their outer or inclined faces slidably engage correspondingly inclined guide faces within the related crosshead. Preferably, the inclined outer faces of the grips in the upper crosshead 14 converge downwardly, while the inclined outer faces of the grips in the lower crosshead 15 converge upwardly, so that the grips of mechanism 19a are urged together by downward movement thereof relative to the upper crosshead and the grips of mechanism 19b are similarly urged together by upward movement thereof relative to the lower crosshead for gripping the end portions of a specimen between the confronting faces of the paired grips. Since the application of a tension load to a specimen held at its upper and lower ends by the gripping mechanisms 19a and 19b, respectively, tends to move the grips of mechanism 19a downwardly relative to crosshead 14 and tends to move the grips of mechanism 19b upwardly relative to crosshead 15, it is apparent that the gripping forces exerted on the opposite ends of the specimen by the mechanisms 19a and 19b are thereby increased to prevent removal of the ends of the specimen from the related gripping mechanisms when the specimen is under tension load. When the grips in mechanism 19a are moved upwardly relative to crosshead 14 and the grips in mechanism 19b are moved downwardly relative to crosshead 15, the confronting faces of the paired grips are spread laterally apart to release the end portions of the specimen or test piece therebetween.

In order to effect the vertical movements of the grips 20 and 21 for gripping and releasing the end portion of a specimen therebetween, each of the gripping mechanisms 19a and 19b includes a shaft 22 journalled in the related crosshead, with its axis extending fore and aft relative to the crosshead, and having a pinion 23 formed on an intermediate portion of the shaft which meshes with racks 24 and 25 on the adjacent side surfaces of the grips 20 and 21, respectively. Thus, rotation of the shaft 22 causes upward or downward movement of the associated grips 20 and 21 relative to the crosshead, depending upon the direction of rotation of the shaft.

One end, preferably the front end, of each shaft 22 has a portion 26 of non-circular, for example, square, cross-section projecting from the related crosshead and adapted to be received in a similarly shaped socket of a removable hand crank 27 (Fig. 1) which can be employed for manually opening and closing the related gripping mechanism. The other or back end of each shaft 22 also projects from the related crosshead and is formed as a pinion 28 (Figs. 2 and 4) terminating in a trunnion 29. A frame 30 of generally U-shaped cross-section extends laterally on the back of each of the crossheads 14 and 15, and the trunnion 29 of each shaft 22 is journalled in the rearmost upstanding wall of the related frame 30. A bearing strip 31 (Fig. 3 and Fig. 4) is mounted on the horizontal portion of each frame 30, and a rack 32 is slidably supported on the bearing strip 31 in mesh with the pinion 28. Thus, as the rack 32 is reciprocated within the frame 30 across the back of the related crosshead, the shaft 22 is rotated to open or close the grips 20 and 21 depending upon the direction of the linear movement of the rack 32.

In order to effect the reciprocating movement of each rack 32, a double-acting cylinder 33 is mounted on an end of the related frame 30 and has its plunger 34 (Fig. 3) connected to the rack 32. The cylinders 33 on the upper and lower crossheads are actuated by a fluid under pressure, for example, compressed air, supplied through a manifold 35 from a source (not shown), for example, a pressure accumulator tank associated with an air compressor, and lines 36a and 36b, at least portions of which are formed of flexible tubing, extend from the manifold 35 to the inlets of four-way valves 37a and 37b mounted on the front faces of crossheads 14 and 15, respectively. Conduits 38a and 39a extend from the two outlet ports of valve 37a to the opposite ends of the cylinder 33 on the upper crosshead. while similar conduits 38b and 39b extend from the two outlet ports of valve 37b to the opposite ends of the cylinder 33 on the lower crosshead. The valves 37a and 37b are of conventional construction and each embody a plug controlled by an external handle which, in a first position, isolates both of the conduits 38a and 39a, or 38b and 39b, from the line 36a or 36b; in a second position, opens the conduit 38a or 38b to atmosphere while establishing communication between the line 36a or 36b and the conduits 39a or 39b, respectively; and, in a third position, opens the conduit 39a or 39b to atmosphere while establishing communication between the line 36a or 36b and the conduits 38a or 38b, respectively.

In the arrangement shown in the drawing, particularly in Fig. 3 thereof, the grips of the mechanisms 19a and 19b are moved laterally together or closed upon the end portions of a specimen therebetween when the related valves 37a and 37b are positioned to supply compressed air through the conduits 38a and 38b to the related cylinders 33, and the grips of the mechanisms 19a and 19b are moved laterally apart to release the specimen when the valves 37a and 37b are positioned to supply compressed air through the conduits 39a and 39b to the related cylinders 33. When the valves 37a and 37b are positioned so that the conduits 38a and 39a and the conduits 38b and 39b are simultaneously closed, the plungers 34 of the related cylinders 33 are held immobile within the latter by the air trapped in the cylinders so that the grips are maintained either in their closed or opened positions.

If desired, each cylinder 33, frame 30 and the related rack 32 may be enclosed in a suitable protective casing 40 which is indicated in broken lines on Figs. 3 and 4. From the foregoing it is apparent that the gripping mechanisms 19a and 19b can be pneumatically actuated, merely by manipulation of the valves 37a and 37b on the crossheads, to either grip or release the end portions of a specimen or test piece, and that such pneumatic actuation can be achieved in only a fraction of the time previously required for manual actuation of the gripping mechanisms by the hand cranks 27. Further, it should be noted that the parts added for pneumatic actuation of the gripping mechanisms 19a and 19b do not interfere with their continued manual actuation by the removable hand cranks, for example, in the event of a failure in the supply of compressed air, and that such added parts, with the exception of the valves 37a and 37b, being mounted on the back surfaces of the upper and lower crossheads, also do not interfere with the insertion or removal of the specimens by an operator at the front of the testing machine, or with the performance of any other usual functions, for example, the measurement of the elongation of a specimen under tension load.

Although a particular embodiment of the invention has been described in detail herein and illustrated in the accompanying drawing, it is to be understood that the invention is not limited to that particular embodiment, and that various changes and modifications may be effected in the latter without departing from the scope or spirit of the invention, except as indicated in the appended claim.

What is claimed is:

In a tension testing machine having upper and lower crossheads, one of which is movable vertically relative to the other for applying a measured tension load to a specimen gripped at its opposite ends in the crossheads; the combination of grips in each of the crossheads movable laterally toward and away from each other by vertical displacement of the grips relative to the crosshead thereby to grip and release, respectively, the end portion of a specimen disposed between the grips, gear racks mounted on and movable vertically with said grips, a shaft journalled in each crosshead and projecting from the front and back of the latter, said shaft having a pinion intermediate its ends meshing with the gear racks of the related grips so that rotation of said shaft will effect vertical displacement of said grips, the front end of said shaft being adapted to receive a removable hand crank for manual rotation of the shaft, a drive pinion on the rear end of said shaft, a drive rack meshing with said drive pinion and supported on the rear portion of the related crosshead for lateral reciprocation relative to the latter, a double-acting, compressed air operated cylinder mounted on the rear portion of the crosshead and having its plunger connected to said drive rack, means for supplying compressed air to the opposite ends of said cylinder, and valve control means mounted on the front portion of the crosshead and operative alternatively to interrupt the supply of compressed air to said cylinder, to direct the supply of compressed air to one end of said cylinder and to direct the supply of compressed air to the other end of said cylinder, whereby the plunger of the cylinder can be selectively stroked for gripping or releasing the end portion of a specimen disposed between the related grips.

References Cited in the file of this patent

UNITED STATES PATENTS

| | | |
|---|---|---|
| 228,214 | Olsen | June 1, 1880 |
| 1,063,916 | Gates | June 3, 1913 |
| 1,943,931 | Ruch | Jan. 16, 1934 |
| 2,425,913 | Golick | Aug. 19, 1947 |
| 2,447,660 | Miklowitf | Aug. 24, 1948 |
| 2,449,955 | Sanderson | Sept. 21, 1948 |
| 2,692,634 | Green | Oct. 26, 1954 |